United States Patent
Yoon

(10) Patent No.: US 10,185,288 B2
(45) Date of Patent: Jan. 22, 2019

(54) APPARATUS AND METHOD FOR MEASURING QUALITY OF HOLOGRAPHIC IMAGE

(71) Applicant: ELECTRONICS AND TELECOMMUNICATIONS RESEARCH INSTITUTE, Daejeon (KR)

(72) Inventor: Min Sung Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/135,922

(22) Filed: Apr. 22, 2016

(65) Prior Publication Data

US 2017/0024890 A1 Jan. 26, 2017

(30) Foreign Application Priority Data

Jul. 21, 2015 (KR) ........................ 10-2015-0103293

(51) Int. Cl.
*G06K 9/00* (2006.01)
*G03H 1/22* (2006.01)

(52) U.S. Cl.
CPC ... *G03H 1/2294* (2013.01); *G03H 2001/2244* (2013.01); *G03H 2001/2247* (2013.01)

(58) Field of Classification Search
None
See application file for complete search history.

(56) References Cited

U.S. PATENT DOCUMENTS

| 5,297,068 | A  | * | 3/1994 | Guilfoyle | G02F 3/00 359/107 |
| 5,432,722 | A  | * | 7/1995 | Guilfoyle | G02F 3/00 359/107 |
| 8,208,701 | B2 | * | 6/2012 | Lendl | G06T 7/33 382/128 |
| 8,783,867 | B2 | * | 7/2014 | Muto | A61B 3/14 351/206 |
| 9,401,009 | B2 | * | 7/2016 | Xu | G06T 5/002 |
| 2007/0091395 | A1 | * | 4/2007 | D'Amato | G03H 1/22 359/9 |
| 2008/0267475 | A1 | * | 10/2008 | Lendl | A61B 6/12 382/130 |

(Continued)

FOREIGN PATENT DOCUMENTS

KR 10-2014-0109801 A 9/2014

*Primary Examiner* — Feng Niu
(74) *Attorney, Agent, or Firm* — NSIP Law

(57) ABSTRACT

A method and apparatus for measuring a quality of a holographic image are provided. An image quality measuring method may include acquiring a first image including a holographic image in a background, and a second image that does not include a holographic image, the first image and the second image being on the same background, extracting a gray level value and a dark-noise counted level value from the first image in a selected range of the first image, extracting a gray level value and a dark-noise counted level value from the second image in the same range as the selected range of the first image, and determining a holographic contrast ratio (HCR) of the holographic image based on the extracted gray level values and the extracted dark-noise counted level values.

17 Claims, 8 Drawing Sheets

(56) References Cited

U.S. PATENT DOCUMENTS

| | | | |
|---|---|---|---|
| 2011/0199579 A1* | 8/2011 | Muto | A61B 3/15 351/208 |
| 2014/0254920 A1* | 9/2014 | Xu | G06T 5/002 382/154 |
| 2015/0062298 A1 | 3/2015 | Choo et al. | |
| 2015/0192898 A1 | 7/2015 | Nam et al. | |

* cited by examiner

APPARATUS AND METHOD FOR MEASURING QUALITY OF HOLOGRAPHIC IMAGE

CROSS-REFERENCE TO RELATED APPLICATION

This application claims the benefit of Korean Patent Application No. 10-2015-0103293, filed on Jul. 21, 2015, in the Korean Intellectual Property Office, the disclosure of which is incorporated herein by reference.

BACKGROUND

1. Field of the Invention

Embodiments relate to an apparatus and method for measuring a quality of a holographic image, and more particularly, to an evaluation method of objectively quantifying and efficiently measuring a quality of a holographic image displayed in a three-dimensional (3D) space, to evaluate the quality of the holographic image.

2. Description of the Related Art

A holographic display technology is an ideal, completely realistic three-dimensional (3D) display technology. The holographic display technology may display a wavefront generated on a given object without a change, to provide the same effect as if the object really exists to user's eyes. In particular, unlike a stereoscopic binocular disparity scheme mainly used in a current 3D display industry, there is no eye strain and dizziness, because inconsistency between accommodation and convergence does not exist. Also, the holographic display technology may enable observation of different images based on a change in a viewpoint, and may be regarded as a ultimate 3D display technology because it is possible to view a plurality of images without a need to use an additional device (for example, glasses) for viewing.

Accordingly, currently, in all countries of the world, a variety of research has been conducted on a new display system obtained by combining a display device that is currently available in common with optical and machine systems, along with active research on display devices. However, to realize the holographic display technology, there are a few requirements.

The requirements may include development of a spatial light modulator (SLM) or a display apparatus for displaying a stereoscopic image with a good quality, an optical-wave illumination unit for providing coherence/parallel straight light characteristics that may induce interference between optical waves, and a method of measuring a quality of a stereoscopic image displayed in a space.

Due to an extremely narrow range of a viewing angle and an extremely small holographic image expressed by only a display device that is currently available in common, it is difficult to actually observe characteristics (for example, a motion parallax, consistency between accommodation and convergence, or a binocular disparity) of a holographic display as an ideal 3D display. The above display system may occupy a relatively large space and may require an optically precise arrangement process, and the like. Also, a holographic display may mainly use an illumination light source with coherence, for example, a laser, however, directly seeing the illumination light source with eyes for a relatively long period of time is dangerous. Accordingly, to prepare an optimum image in the holographic display, a user may need to indirectly observe and view images through capturing of a camera in most cases. Thus, an evaluation method of objectively quantifying and efficiently measuring a quality of a stereoscopic image displayed in a 3D space using an SLM to evaluate the quality may necessarily need to be provided to holography researchers and holography viewers.

SUMMARY

Embodiments provide a method and apparatus for efficiently evaluating a quality of a holographic image displayed in a three-dimensional (3D) space by measuring a holographic contrast ratio (HCR) of the holographic image.

According to an aspect, there is provided an image display method using a spatial light modulator (SLM), the image display method including converting 3D data to holographic data and uploading the holographic data to the SLM so that the holographic data is suitable for a display to display a holographic image, emitting an illumination light to the SLM, and displaying a holographic image on an active area formed by the SLM based on the holographic data and the illumination light.

The holographic data may be generated based on a preset test pattern.

The illumination light may have coherence.

The illumination light may have a feature of a parallel plane wave so that the illumination light is expanded to correspond to the active area.

The emitting may include uniformly emitting the illumination light to the active area.

The displaying may include displaying the holographic image by collecting or dispersing light in the active area when the illumination light passes through the SLM or is reflected from the SLM.

According to another aspect, there is provided an image quality controlling method including acquiring a first image including a holographic image generated by a holographic display in a background, and a second image that does not include a holographic image, the first image and the second image being on the same background, extracting a gray level value and a dark-noise counted level value from the first image in a selected range of the first image, extracting a gray level value and a dark-noise counted level value from the second image in the same range as the selected range of the first image, determining an HCR of the holographic image based on the extracted gray level values and the extracted dark-noise counted level values, and adjusting the holographic display based on the determined HCR.

The adjusting of the holographic display may include adjusting an intensity of the holographic display based on the determined HCR.

The adjusting of the holographic display may also include adjusting a power of a light source of the holographic display based on the determined HCR.

The HCR of the holographic image may be provided twice based on an intensity of the light source.

The adjusting of the intensity of the holographic display may increase the HCR of the holographic image.

The gray level value may include a local peak value and a local dip value.

The acquiring may include receiving the first image and the second image from a digital camera or a general camera for acquiring an image.

The digital camera or the general camera may be configured to acquire monochrome image quality information or RGB image quality information from the holographic image.

According to another aspect, there is provided an image display apparatus including a holographic data converter configured to convert 3D data to holographic data and to upload the holographic data to the SLM so that the holographic data is suitable for a display to display a holographic image, a light source configured to emit an illumination light to an SLM, and the SLM configured to display a holographic image on an active area formed by the SLM based on the holographic data and the illumination light.

The holographic data may be generated based on a preset test pattern.

The illumination light may have coherence.

The illumination light may have a feature of a parallel plane wave so that the illumination light is expanded to correspond to the active area.

The light source may be configured to uniformly emit the illumination light to the active area.

The SLM may be configured to display the holographic image by collecting or dispersing light in the active area when the illumination light passes through the SLM or is reflected from the SLM.

According to another aspect, there is provided an image quality controlling apparatus including a camera, a holographic display configured to generate a holographic image, and a processor configured to acquire a first image including a holographic image in a background, and a second image that does not include a holographic image, the first image and the second image being on the same background, to extract a gray level value and a dark-noise counted level value from the first image in a selected range of the first image, to extract a gray level value and a dark-noise counted level value from the second image in the same range as the selected range of the first image, to determine an HCR of the holographic image based on the extracted gray level values and the extracted dark-noise counted level values, and to adjust the holographic display based on the determined HCR.

The gray level value may include a local peak value and a local dip value.

The image quality measurer may be configured to receive the first image and the second image from the camera.

The camera may be configured to acquire monochrome image quality information or RGB image quality information from the holographic image.

EFFECT

According to embodiments, it is possible to efficiently evaluate a quality of a holographic image displayed in a three-dimensional (3D) space by measuring a holographic contrast ratio (HCR) of the holographic image.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
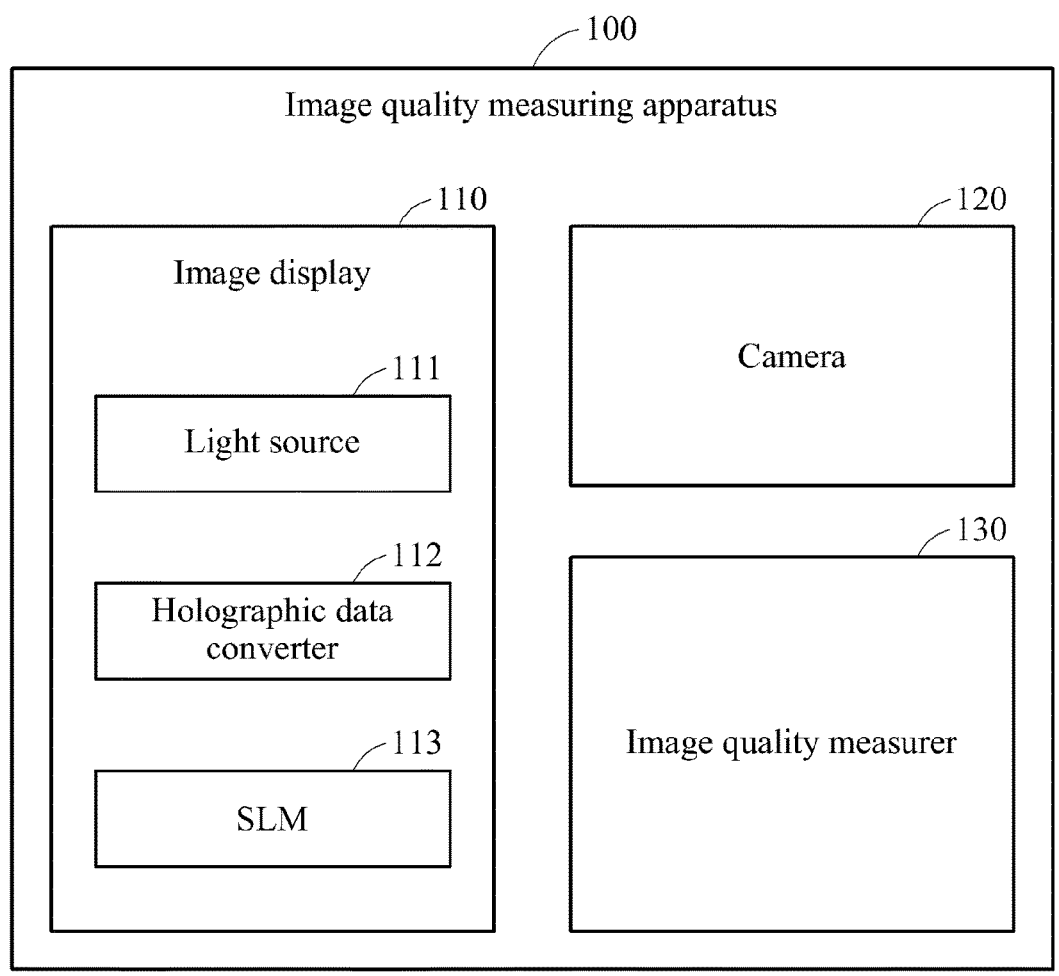
FIG. 1 is a block diagram illustrating an image quality measuring apparatus according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 is a block diagram illustrating an image quality measuring apparatus 100 according to an embodiment.

The image quality measuring apparatus 100 of FIG. 1 may include an image display 110, a camera 120, and an image quality measurer 130. The image display 110 may display a holographic image based on 3D data. The image display 110 may include a light source 111, a holographic data converter 112 and a spatial light modulator (SLM) 113. The light source 111 may generate illumination light and may emit the illumination light to the SLM 113. The generated illumination light may have a feature of coherent light. The coherent light may refer to light that has a single frequency spectrum, of which a phase is locked, that represents a characteristic of a uniform sine wave, and that enables interference in a long distance. The above coherent light may be generated and used in, for example, a laser or a holography.

Also, the illumination light generated by the light source 111 may generate a wave field having a characteristic of a parallel plane wave. Accordingly, the illumination light may have a characteristic of a parallel plane wave, to be expanded to correspond to an active area formed by the SLM 113 by passing through the SLM 113. The illumination light emitted to the active area by the SLM 113 may have an equal intensity. The active area may refer to an area in which a holographic image is actually displayed by the image display 110, and may correspond to, for example, a display (not shown) of the image display 110.

Figure 3:
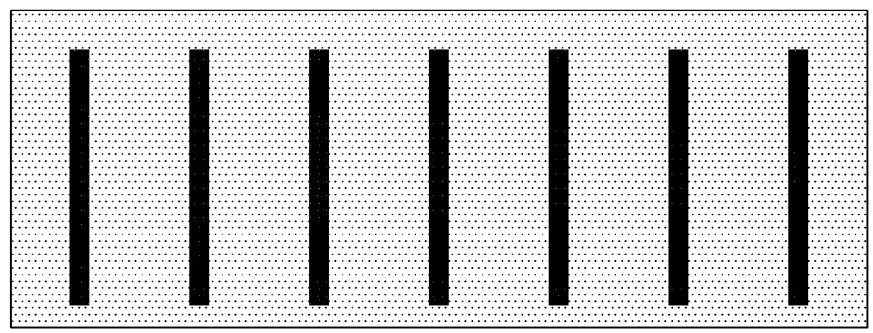
FIG. 3 is a diagram illustrating a test pattern according to an embodiment.

The holographic data converter 112 may convert 3D data to be displayed to holographic data so that the holographic data may be suitable for a type of a display apparatus to display a holographic image. Generally, the 3D data may include a two-dimensional (2D) image and depth information. The holographic data may be generated based on a preset test pattern. For example, the holographic data converter 112 may generate holographic data used to display holographic images with various shapes using a preset test pattern shown in FIG. 3. In other words, when 3D data to be displayed is a square, the holographic data converter 112 may convert the 3D data to holographic data representing the square using the preset test pattern. A variety of holographic data may be generated based on a characteristic and a type of a used SLM. The holographic data converter 112 may upload the holographic data to the SLM 113.

The holographic data converter 112 may perform a pretest to verify an accuracy of the holographic data. For example, the holographic data converter 112 may determine whether conversion to the holographic data is properly performed through a simulation using a numerical method using the holographic data.

The SLM 113 may display a holographic image on the active area based on the holographic data received from the holographic data converter 112 and the illumination light emitted from the light source 111. When the illumination light emitted from the light source 111 is passed through or reflected from the SLM 113, the SLM 113 may collect the illumination light on the active area or may disperse the illumination light, to display the holographic image. The active area may refer to an area on which the holographic image is displayed.

Figure 4A:
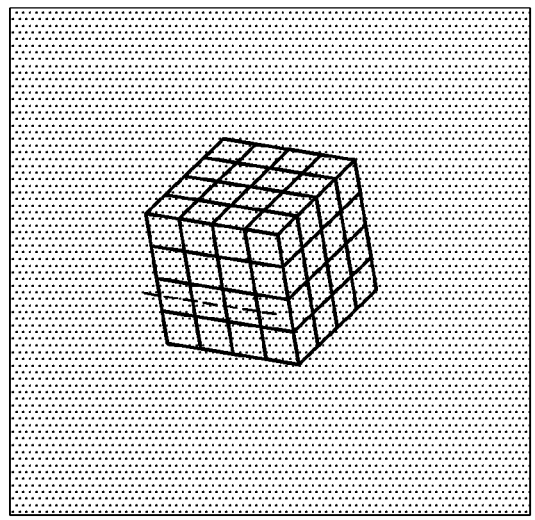
FIGS. 4A and 4B are diagrams illustrating examples of an image acquired by capturing an optically display holographic image and a black background using a camera according to an embodiment.
Figure 4B:
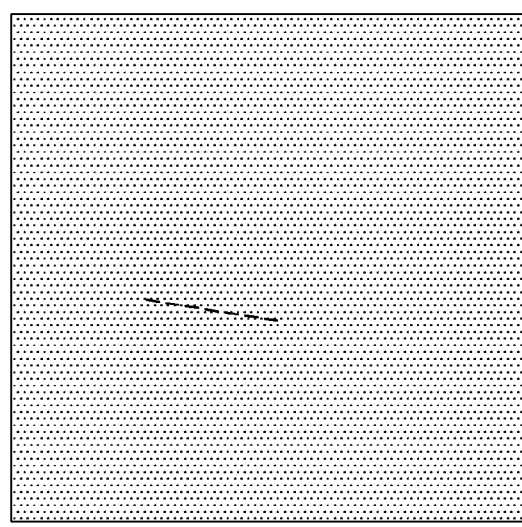

The camera 120 may acquire an image of the holographic image displayed using the image display 110 to evaluate a quality of the displayed holographic image. The camera 120 may include both an general camera or a digital camera, for example, a digital single-lens reflex camera (DSLR), to acquire an image. For example, the camera 120 may acquire a first image including a holographic image in a condition that the camera 120 is focused on the holographic image displayed on an active area, as shown in FIG. 4A. Also, the camera 120 may acquire a second image that does not include the holographic image, in the same background and the same focus condition as the first image, as shown in FIG. 4B. The camera 120 may acquire monochrome image quality information or RGB color image quality information from an image of the holographic image. The camera 120 may transfer the acquired first image and the acquired second image to the image quality measurer 130, to measure a quality of the holographic image.

The image quality measurer 130 may measure the quality of the holographic image based on the image of the holographic image received using the camera 120. In a 2D display according to a related art, a contrast ratio (CR) for modulation of a light intensity may be defined from each luminance data measured using a light intensity measurement apparatus in a white state condition and a black state condition. In other words, the CR may be obtained by dividing luminance in a white state by luminance in a black state. The luminance may be measured in candela per square metre (cd/m$^2$).

Because a complete 3D image, for example, a holographic image, includes a plurality of light points with different depths, definition of the above luminance-based CR scheme may not be suitable for quantitatively measurement or analysis of a contrast level of a holographic image. Accordingly, in the present disclosure, a new CR based on measurement of a gray level may be defined below.

The image quality measurer 130 may select and designate a range and a position for scanning from the first image and the second image received from the camera 120. The image quality measurer 130 may select the same position and the same range from the first image and the second image. In other words, the image quality measurer 130 may scan a dashed-line in the same position as shown in FIGS. 4A and 4B.

The image quality measurer 130 may extract a local peak value and a local dip value of a gray level $G_i$ from a scanned area of each of the first image and the second image. The gray level may be a numerical value representing a brightness or a density in each pixel of an image. For example, an 8-bit image may be represented by $2^8$, that is, 256 gray levels. For example, black and white may have values of "0" and "255," respectively, and gray may have a value between "0" and "255" based on a brightness of black and white. The image quality measurer 130 may obtain a statistical average value of the extracted local peak value and the extracted local dip value, and may use the statistical average value to measure a quality of the holographic image.

The image quality measurer 130 may extract a dark-noise counted level value from a scanned area of each of the first image and the second image. In a light sensor included in a general camera, when no light is incident, an output signal may ideally have a value of "0." However, actually, a signal may have a constant value due to thermal electrons generated in the light sensor, which may be referred to as dark noise. In other words, the dark noise may be a sort of signals received by background noise even in a dark state.

The image quality measurer 130 may define a holographic contrast ratio (HCR) of the holographic image displayed by the image display 110, based on the extracted local peak value, the extracted local dip value and the extracted dark-noise counted level value. The HCR may be one of important specifications indicating a performance of a display, and may refer to a difference in brightness between a brightest area and a darkest area in a display screen. In other words, when the HCR increases, an image quality may increase.

The HCR may be defined as shown in Equation 1 below.

$$HCR_{ij} = (G_{W_i} - G_{0_i})/(G_{B_j} - G_{0_j})$$

In Equation 1, $G_{W_i}$ and $G_{0_i}$ denote a gray level and a dark-noise counted level of a target pixel point $(X_i, Y_i)$ in a white state condition, respectively. Also, $G_{B_j}$ and $G_{0_j}$ denote a gray level and a dark-noise counted level of the target pixel point $(X_i, Y_i)$ in a black state condition, respectively. To remove effects of background light, the dark-noise counted level may be subtracted from the gray level. The white state condition may refer to a state in which a holographic image is displayed in an active area, and the black state condition may refer to a state in which a holographic image is not displayed in the same active area as in the white state condition.

The gray level and the dark-noise counted level measured at the target pixel point may have different ranges of values based on a type of displays. For example, in a display with an 8-bit resolution, a gray level and a dark-noise counted level may have integers between "0" and "255." In a display with a 16-bit resolution, a gray level and a dark-noise counted level may have integers between "0" and "65535."

The image quality measurer 130 may evaluate the quality of the displayed holographic image based on the HCR acquired using Equation 1. In other words, when the HCR of the displayed holographic image increases, the quality of the holographic image may increase.

The image quality measurer 130 may repeatedly perform a process of acquiring an HCR a plurality of times. The image quality measurer 130 may acquire an average and a standard deviation of HCRs acquired through the process, and thus it is possible to evaluate a more accurate quality of a holographic image.

Figure 2A:
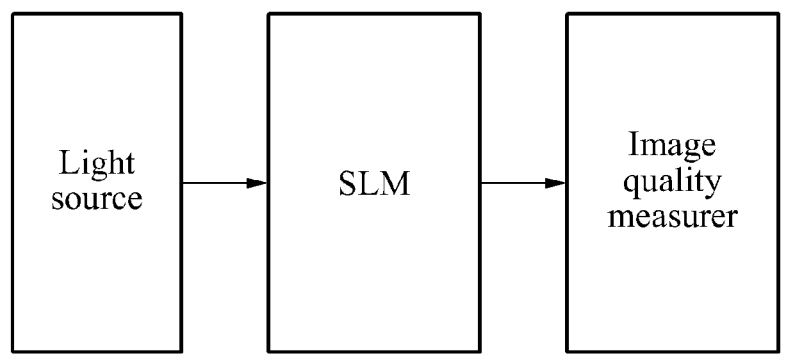
FIGS. 2A, 2B and 2C are diagrams illustrating examples of an arrangement of a light source, a spatial light modulator (SLM), and an image quality measurer according to an embodiment.
Figure 2B:
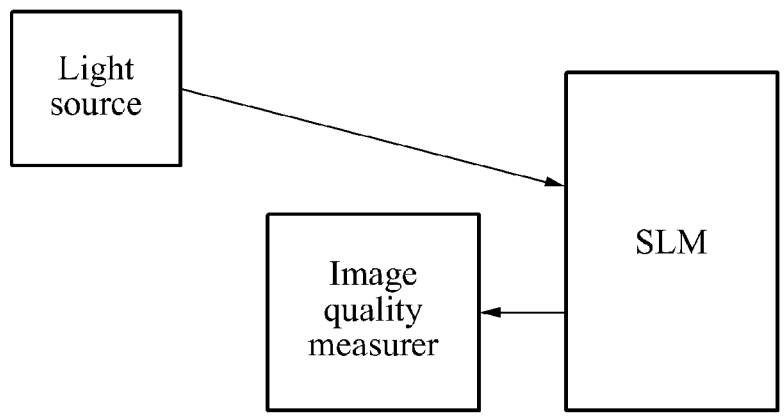
Figure 2C:
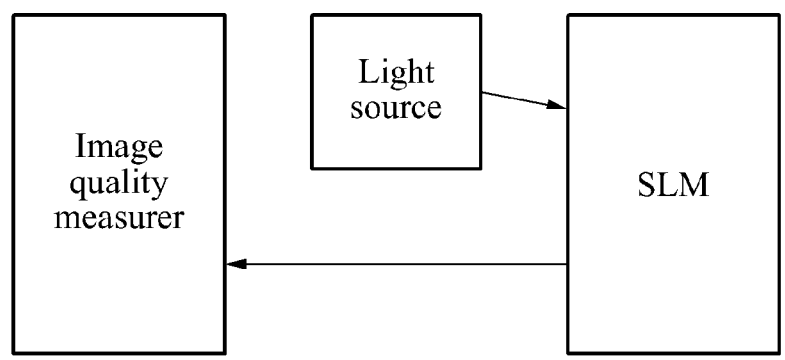

FIGS. 2A, 2B and 2C illustrate examples of an arrangement of a light source, an SLM, and an image quality measurer according to an embodiment.

The light source, the SLM, and the image quality measurer may be arranged using various schemes. In an example, referring to FIG. 2A, the image quality measurer may face the SLM, and the light source may be located in an opposite region to a region in which the image quality measurer is located based on the SLM. In another example, the image quality measurer may face the SLM, and the light source may be located in the same region as the region in which the image quality measurer is located. Referring to FIG. 2B, the image quality measurer may be located closer to the SLM than the light source. Referring to FIG. 2C, the image quality measurer may be located farther from the SLM than the light source.

The above arrangements of the light source, the SLM and the image quality measurer may be determined based on a type of the SLM. For example, when the SLM is a device capable of transmitting illumination light emitted by the light source, the light source, the SLM and the image quality measurer may be arranged as shown in FIG. 2A. When the SLM is a device capable of reflecting illumination light emitted by the light source, the light source, the SLM and the image quality measurer may be arranged as shown in FIGS. 2B and 2C.

Figure 5:
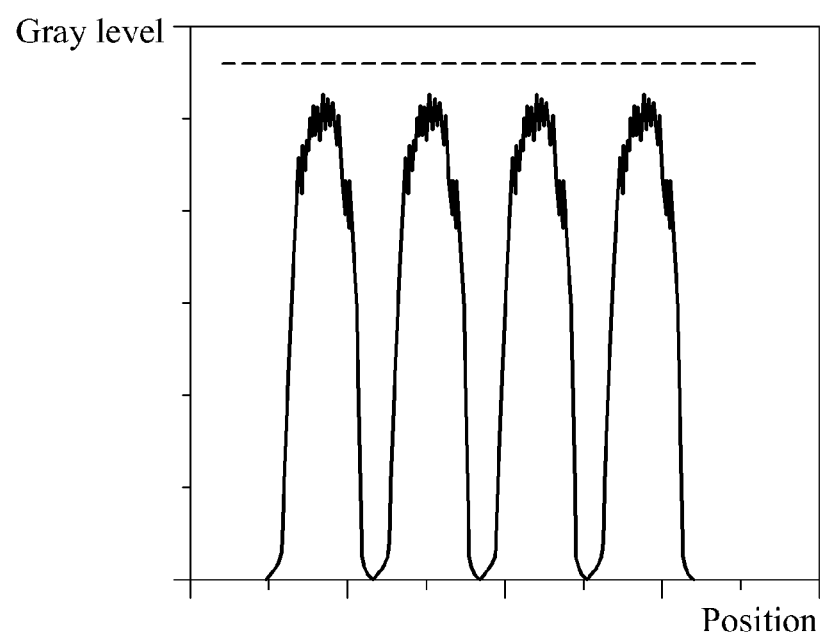
FIG. 5 is a measurement graph showing gray level values in a scanning range of FIGS. 4A and 4B according to an embodiment.

FIG. 5 is a measurement graph showing gray level values in a scanning range of FIGS. 4A and 4B according to an embodiment.

The image quality measurer 130 may extract a gray level value for a scanning range from an image of a holographic image received from a camera. For example, it is assumed that black and white have values of "0" and "255," respectively, and that a gray level has a value between "0" and "255" based on a brightness of black and white. The gray level value may change based on a scanning position as shown in FIG. 5. In other words, a position at which a holographic image is displayed may be represented by gray due to an increase in a gray level, and a position at which a holographic image is not displayed may be represented by black because a gray level value is close to "0."

The image quality measurer 130 may extract a local peak value and a local dip value of the gray level for the scanning range from the image of the holographic image, and may use the local peak value and the local dip value, to measure a quality of the holographic image. The local peak value and the local dip value may be a maximum value and a minimum value of the gray level, respectively.

Figure 6:
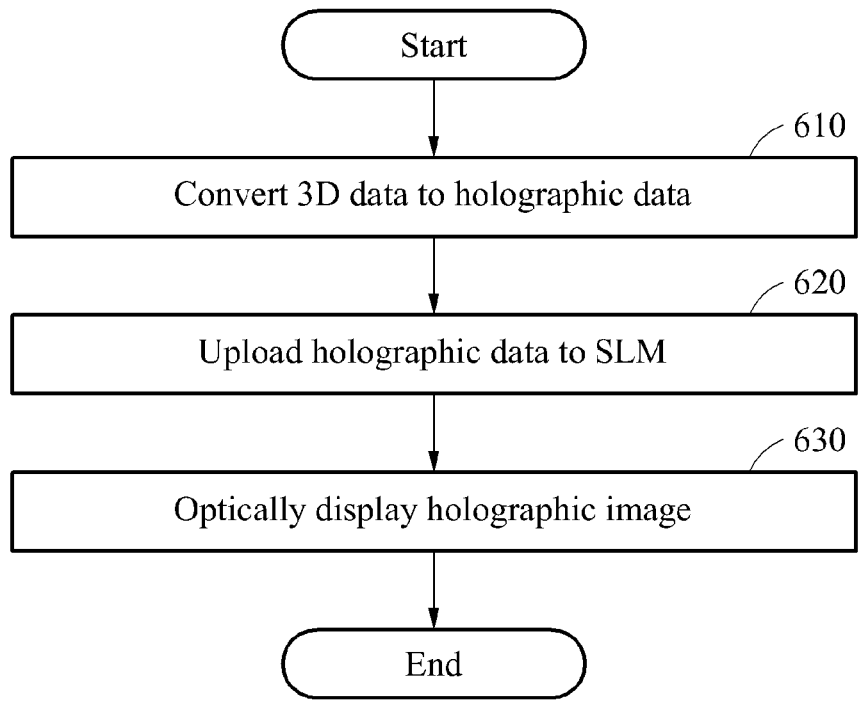
FIG. 6 is a flowchart illustrating a method of generating a holographic image according to an embodiment.

FIG. 6 is a flowchart illustrating a method of generating a holographic image according to an embodiment.

Referring to FIG. 6, in operation 610, the holographic data converter 112 in the image display 110 may convert 3D data to be displayed in 3D to holographic data so that the holographic data may be suitable for a type of a display apparatus to display a holographic image. Generally, the 3D data may include a two-dimensional (2D) image and depth information. The holographic data may be generated based on a preset test pattern. For example, the holographic data converter 112 may generate holographic data used to display holographic images with various shapes using a preset test pattern shown in FIG. 3. In other words, when 3D data to be displayed is a square, the holographic data converter 112 may convert the 3D data to holographic data representing the square using the preset test pattern. A variety of holographic data may be generated based on a characteristic and a type of a used SLM.

In operation 620, the holographic data converter 112 may upload the holographic data obtained in operation 610 to the SLM 113. The holographic data converter 112 may perform a pretest to verify an accuracy of the holographic data. For example, the holographic data converter 112 may determine whether conversion to the holographic data is properly performed through a simulation using a numerical method using the holographic data.

In operation 630, the image display 110 may optically display a holographic image. The SLM 113 in the image display may display the holographic image on an active area based on the holographic data received from the holographic data converter 112 and illumination light emitted from the light source 111. When the illumination light emitted from the light source 111 is passed through or reflected from the SLM 113, the SLM 113 may collect the illumination light on the active area or may disperse the illumination light, to display the holographic image. The active area may refer to an area on which the holographic image is displayed.

Figure 7:
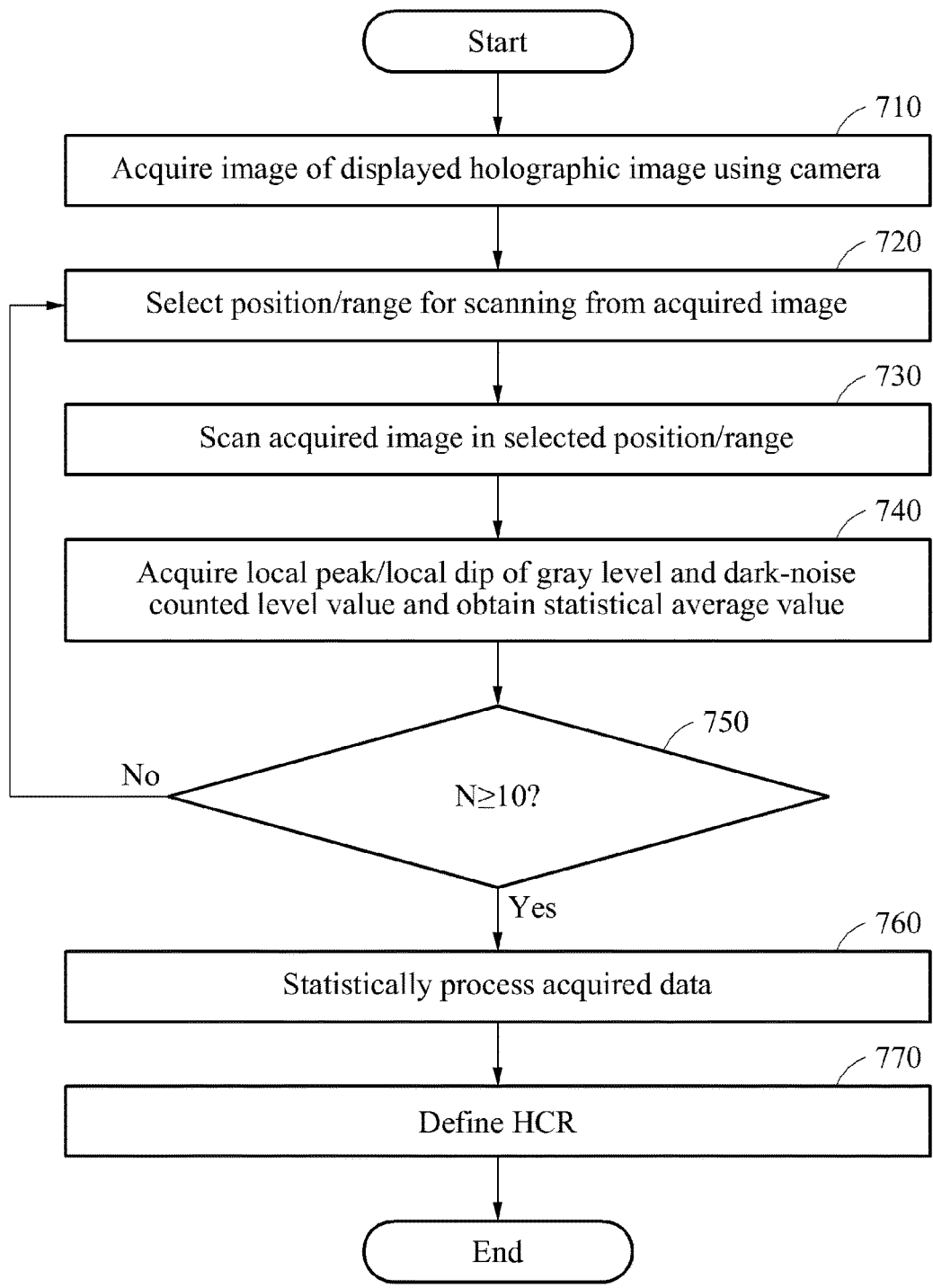
FIG. 7 is a flowchart illustrating a method of measuring a quality of a holographic image according to an embodiment.

FIG. 7 is a flowchart illustrating a method of measuring a quality of a holographic image according to an embodiment.

Referring to FIG. 7, in operation 710, the image quality measurer 130 may acquire an image of a displayed holographic image using the camera 120. For example, the camera 120 may acquire a first image including a holographic image in a condition that the camera 120 is focused on the holographic image displayed on an active area, as shown in FIG. 4A. Also, the camera 120 may acquire a second image that does not include the holographic image, in the same background and the same focus condition as the first image, as shown in FIG. 4B. The camera 120 may acquire monochrome image quality information or RGB color image quality information from the image of the holographic image. The image quality measurer 130 may receive the first image and the second image from the camera 120.

In operation 720, the image quality measurer 130 may select and designate a range and a position for scanning from the first image and the second image received from the camera 120. The image quality measurer 130 may select the same position and the same range from the first image and the second image. In other words, the image quality measurer 130 may designate a dashed-line in the same position as a range and a position for scanning, as shown in FIGS. 4A and 4B.

In operations 730 and 740, the image quality measurer 130 may extract a local peak value and a local dip value of a gray level $G_i$ from a scanned area of each of the first image and the second image. The gray level may be a numerical value representing a brightness or a density in each pixel of an image. For example, an 8-bit image may be represented by $2^8$, that is, 256 gray levels. For example, black and white may have values of "0" and "255," respectively, and gray may have a value between "0" and "255" based on a brightness of black and white. The image quality measurer 130 may obtain a statistical average value of the extracted local peak value and the extracted local dip value, and may use the statistical average value to measure a quality of the holographic image.

The image quality measurer 130 may extract a dark-noise counted level value from a scanned area of each of the first image and the second image. In a light sensor included in a general camera, when no light is incident, an output signal may ideally have a value of "0." However, actually, a signal may have a constant value due to electrons thermally generated in the light sensor, which may be referred to as dark noise. In other words, the dark noise may be a sort of signals received by background noise even in a dark state.

In operation 750, the image quality measurer 130 may repeatedly perform operations 720 through 740 based on a preset number of times. The image quality measurer 130 may repeatedly perform a plurality of times a process of selecting another range for scanning in operation 720 and extracting a gray level value and a dark-noise counted level value in the selected range.

In operation 760, the image quality measurer 130 may statistically process gray level values and dark-noise counted level values extracted in operations 720 through 750. For example, the image quality measurer 130 may obtain an average value of gray level values acquired in different scanning ranges and an average value of dark-noise counted level values acquired in different scanning ranges.

In operation 770, the image quality measurer 130 may define an HCR of the holographic image, based on the gray level value and the dark-noise counted level value obtained in operation 760. The HCR may be one of important specifications indicating a performance of a display, and may refer to a difference in brightness between a brightest area and a darkest area in a display screen. In other words, when the HCR increases, an image quality may increase. The HCR may be defined as described above with reference to Equation 1.

Figure 8:
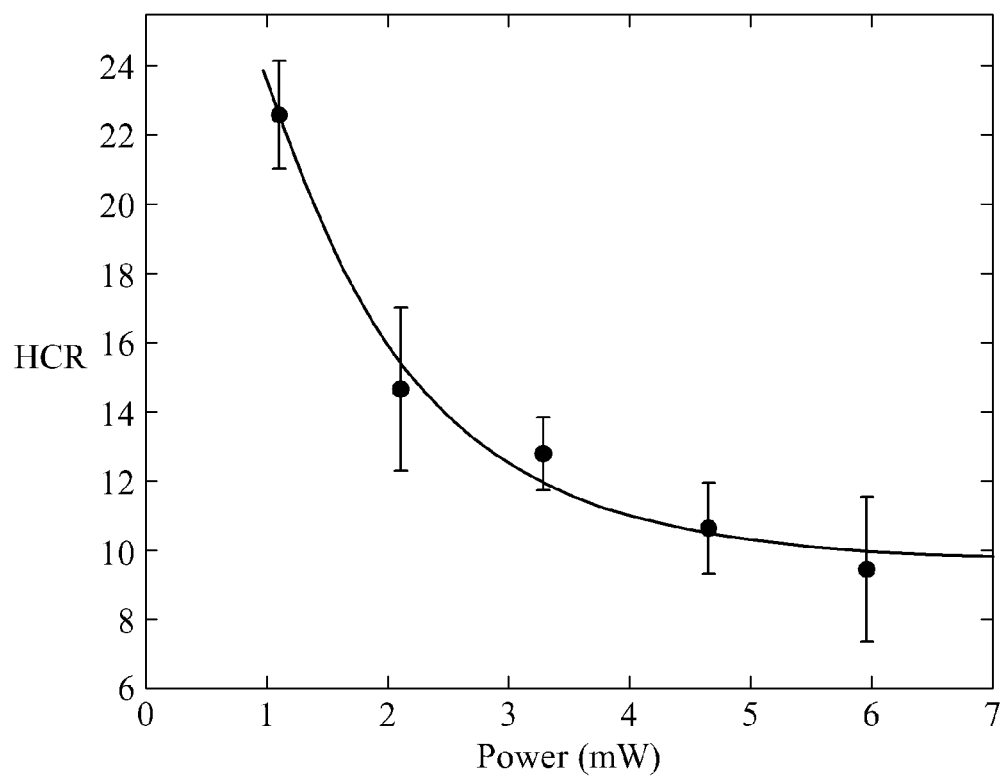
FIG. 8 is a graph illustrating a holographic contrast ratio (HCR) of a holographic image based on a power of an illumination light source according to an embodiment.

FIG. 8 is a graph illustrating an HCR of a holographic image based on a power of an illumination light source according to an embodiment.

FIG. 8 illustrates a curve representing a characteristic of an HCR acquired from a displayed holographic image based on an intensity of a light source that emits light in an actual display. A display used in FIG. 8 may provide an HCR up to twice based on a condition of the intensity of the light source. Thus, it may be found that the display used in FIG. 8 may be a hologram display apparatus to display an image with a relatively high quality in a condition of an illumination with a low intensity.

As described above, according to embodiments, it is possible to provide objectivity to quantitatively measure a quality of a holographic image displayed by an SLM that has been increasingly advanced with a development of electronic device technologies today. Also, according to embodiments, there is a great significance for implementing an image quality measuring apparatus to provide suitability for acquiring a quality of a holographic image generated in a 3D space and an efficiency by automation to simplify an image quality measuring method.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image quality controlling method, comprising:
   acquiring, by a processor, a first image comprising a holographic image generated by a holographic display, and a second image that does not comprise a holographic image, the first image and the second image being on a same background;
   extracting, by the processor, a first gray level value and a first dark-noise counted level value from the first image in a selected range of the first image;
   extracting, by the processor, a second gray level value and a second dark-noise counted level value from the second image in a same range as the selected range of the first image;
   determining, by the processor, a holographic contrast ratio (HCR) of the holographic image based on the extracted first and second gray level values and the extracted first and second dark-noise counted level values; and
   adjusting the holographic display based on the determined HCR.

2. The image quality controlling method of claim 1, wherein the first and second gray level values comprise a local peak value and a local dip value.

3. The image quality controlling method of claim 1, wherein the acquiring comprises receiving the first image and the second image from a digital camera or a general camera.

4. The image quality controlling method of claim 3, wherein the digital camera or the general camera is configured to acquire monochrome image quality information or RGB image quality information from the holographic image.

5. The image quality controlling method of claim 1, wherein
   the extracted first and second dark-noise counted level values are zero or nonzero based on a performance of the digital camera or the general camera, and
   the determining comprises determining the HCR by subtracting, from the extracted first and second gray level values, the first and second dark-noise counted level values, respectively.

6. The image quality controlling method of claim 1, further comprising repeatedly measuring the determined HCR based on the first image and the second image, and statistically processing the measured HCR.

7. The image quality controlling method of claim 6, wherein the measuring comprises determining an average and a standard deviation of the measured HCR.

8. The image quality controlling method of claim 1, further comprising displaying, by a monitor display, the determined HCR.

9. The image quality controlling method of claim 8, wherein the displaying of the HCR comprises plotting the HCR on a plot of power of the holographic display verses HCR.

10. The image quality controlling method of claim 9, wherein the displaying of the HCR further comprises rendering a best-fit line along HCR values on the plot.

11. The image quality controlling method of claim 1, wherein the adjusting of the holographic display comprises adjusting an intensity of the holographic display based on the determined HCR.

12. The image quality controlling method of claim 11, wherein the adjusting of the intensity of the holographic display increases the HCR of the holographic image.

13. The image quality controlling method of claim 1, wherein the adjusting of the holographic display comprises adjusting a power of a light source of the holographic display based on the determined HCR.

14. The image quality controlling method of claim 13, wherein the HCR of the holographic image is provided twice based on an intensity of the light source.

15. An image quality controlling apparatus, comprising:
   a camera;
   a holographic display configured to generate a holographic image; and
   a processor configured to
      acquire, from the camera, a first image comprising the holographic image generated by the holographic display, and a second image that does not comprise a holographic image, the first image and the second image being on a same background, extract a first gray level value and a first dark-noise counted level value from the first image in a selected range of the first image, extract a second gray level value and a second dark-noise counted level value from the second image in a same range as the selected range of the first image, determine a holographic contrast ratio (HCR) of the holographic image based on the extracted first and second gray level values and the extracted first and second dark-noise counted level values, and adjust the holographic display based on the determined HCR.

16. The image quality controlling apparatus of claim 15, wherein the first and second gray level values comprise a local peak value and a local dip value.

17. The image quality controlling apparatus of claim 15, wherein the camera is configured to acquire monochrome image quality information or RGB image quality information from the holographic image.

* * * * *